United States Patent
Aota et al.

(10) Patent No.: US 10,226,726 B2
(45) Date of Patent: Mar. 12, 2019

(54) INTAKE AIR FILTER DEVICE, FILTER REPLACEMENT METHOD OF INTAKE AIR FILTER DEVICE, AND GAS TURBINE

(71) Applicant: MITSUBISHI HITACHI POWER SYSTEMS, LTD., Kanagawa (JP)

(72) Inventors: Toyosei Aota, Yokohama (JP); Eiji Naito, Yokohama (JP); Hiroyuki Katayama, Yokohama (JP)

(73) Assignee: MITSUBISHI HITACHI POWER SYSTEMS, LTD., Kanagawa (JP)

( * ) Notice: Subject to any disclaimer, the term of this patent is extended or adjusted under 35 U.S.C. 154(b) by 72 days.

(21) Appl. No.: 15/307,190

(22) PCT Filed: May 21, 2015

(86) PCT No.: PCT/JP2015/064589
§ 371 (c)(1),
(2) Date: Oct. 27, 2016

(87) PCT Pub. No.: WO2015/178449
PCT Pub. Date: Nov. 26, 2015

(65) Prior Publication Data
US 2017/0050135 A1  Feb. 23, 2017

(30) Foreign Application Priority Data
May 23, 2014 (JP) .................................. 2014-107160

(51) Int. Cl.
*B01D 46/00* (2006.01)
*F02C 7/052* (2006.01)
(Continued)

(52) U.S. Cl.
CPC ....... *B01D 46/0004* (2013.01); *B01D 46/002* (2013.01); *B01D 46/0005* (2013.01);
(Continued)

(58) Field of Classification Search
CPC ... B01D 46/0087; F01D 25/002; F01D 25/32; F02C 7/05; F02C 7/055; Y10T 29/49238
(Continued)

(56) References Cited

U.S. PATENT DOCUMENTS

| 2013/0255359 A1* | 10/2013 | Smith | F02C 7/05 73/38 |
| 2014/0196437 A1* | 7/2014 | Schneider | F02C 7/05 60/273 |
| 2015/0219010 A1* | 8/2015 | Santini | F01D 25/002 60/39.092 |

FOREIGN PATENT DOCUMENTS

| JP | 04-267914 | 9/1992 |
| JP | 09-060528 | 3/1997 |

(Continued)

OTHER PUBLICATIONS

International Search Report dated Aug. 25, 2015 in International Application No. PCT/JP2015/064589 (with English translation.
(Continued)

*Primary Examiner* — Duane Smith
*Assistant Examiner* — Minh Chau T Pham
(74) *Attorney, Agent, or Firm* — Wenderoth, Lind & Ponack, L.L.P.

(57) ABSTRACT

An intake air filter device includes a filter member in an intake air path of a gas turbine. The intake air filter device includes: a frame body that supports the filter member which is configured to be inserted thereinto from an upstream side in a direction in which a fluid is to flow through the intake air path; and a closure plate engaging part mounted on a downstream side of the frame body and serving to engage a closure plate that covers a downstream side of the filter member.

16 Claims, 11 Drawing Sheets

(51) Int. Cl.
*B01D 46/10* (2006.01)
*B01D 46/24* (2006.01)

(52) U.S. Cl.
CPC .......... *B01D 46/008* (2013.01); *B01D 46/10* (2013.01); *B01D 46/2411* (2013.01); *F02C 7/052* (2013.01); *B01D 2265/02* (2013.01); *B01D 2279/60* (2013.01); *F05D 2220/32* (2013.01)

(58) Field of Classification Search
USPC ................ 55/309, 413; 60/39.092, 273, 311; 29/888.21
See application file for complete search history.

(56) References Cited

FOREIGN PATENT DOCUMENTS

| | | |
|---|---|---|
| JP | 2006-057619 | 3/2006 |
| JP | 2007-046588 | 2/2007 |
| JP | 2008-031967 | 2/2008 |
| JP | 2008-184982 | 8/2008 |
| JP | 2009-047150 | 3/2009 |
| JP | 2014-077400 | 5/2014 |
| WO | 2012/084892 | 6/2012 |

OTHER PUBLICATIONS

Written Opinion of the International Searching Authority dated Aug. 25, 2015 in International Application No. PCT/JP2015/064589 (with English translation).

* cited by examiner

INTAKE AIR FILTER DEVICE, FILTER REPLACEMENT METHOD OF INTAKE AIR FILTER DEVICE, AND GAS TURBINE

CROSS-REFERENCE TO RELATED APPLICATION

The present application claims priority based on Japanese Patent Application No. 2014-107160 filed on May 23, 2014, the contents of which are incorporated herein by reference.

TECHNICAL FIELD

The present invention relates to an intake air filter device, a filter replacement method of an intake air filter device, and a gas turbine including the intake air filter device.

BACKGROUND ART

A gas turbine includes a compressor that takes in and compresses air, a combustor that produces combustion gas by combusting fuel in the compressed air, and a turbine that is driven by the high-temperature, high-pressure combustion gas.

Here, if the air taken in contains dust, due to adhesion of the dust to the blades and vanes of the turbine compressor, the fluid resistance increases and the output loss increases accordingly, which may result in reduced gas turbine output.

Therefore, the gas turbine is equipped with an intake air filter device that removes dust contained in the atmospheric air. Such an intake air filter device includes a single filter member or a combination of a plurality of filter members.

It is important in operating the gas turbine to regularly perform cleaning work and replacement work on the filter member, since clogging etc. of the filter member lead to degradation of the air intake performance.

One known example of a structure that allows smooth replacement of a filter member during operation is described in Japanese Patent Publication No. 2008-184982. The technique described in Japanese Patent Publication No. 2008-184982 is an example in which an air shield plate is provided on the downstream side of a filter device and transfer means for opening and closing the air shield plate in the upper-lower direction by an overhead crane, etc., is provided.

Technical Problem

However, the technique described in Japanese Patent Publication No. 2008-184982 requires a massive device. Moreover, a problem arises as to the structure for sealing the air shield plate, but the specific structure is not disclosed.

Having been devised in view of these circumstances, the present invention aims to provide an intake air filter device that allows simple replacement of the filter member even during operation of the gas turbine, a filter replacement method of an intake air filter device, and a gas turbine.

SUMMARY OF INVENTION

Solution to Problem

To solve the above problem, the present invention has adopted the following solutions.

According to a first aspect of the present invention, there is provided an intake air filter device with a filter member disposed in an intake air path of a gas turbine, the intake air filter device including: a frame body that supports the filter member inserted thereinto from the upstream side in a direction in which a fluid flows through the intake air path; and a closure plate engaging part mounted on the downstream side of the frame body and serving to engage a closure plate that covers the downstream side of the filter member.

According to this configuration, it is possible to prevent the inflow of foreign substances into the compressor even when replacing the filter member during operation of the gas turbine.

According to a second aspect of the present invention, in the intake air filter device according to the first aspect, the engaging part may include a guide member that supports the closure plate so as to be movable in a direction intersecting the direction in which a fluid flows through the intake air path.

According to this configuration, the closure plate can be held stably by the guide member even during operation of the gas turbine. In addition, to dispose the closure plate, the closure plate can be moved in the direction intersecting the fluid flow direction. In other words, the closure plate can be disposed without requiring a large force even when a fluid is flowing through the intake air path.

According to a third aspect of the present invention, the guide member of the intake air filter device according to the second aspect may be composed of a pair of guide members that are disposed one on each side of the filter member; the guide members may each have a groove capable of receiving the closure plate; and openings of the grooves may face each other.

According to this configuration, it is easy to insert the closure plate into the guide members.

According to a fourth aspect of the present invention, the intake air filter device according to the first aspect may include a closure plate that is mounted on the frame body through the engaging part.

According to this configuration, the flow of the fluid can be blocked by the closure plate, so that the differential pressure (pressure difference) acting on the filter member to be replaced can be reduced.

Thus, the filter member can be replaced even during operation of the gas turbine.

According to a fifth aspect of the present invention, the frame body of the intake air filter device according to the first aspect may include a plate-like tube sheet, and the filter member may be supported on the tube sheet.

According to this configuration, the filter member can be easily replaced even during operation of the gas turbine.

According to a sixth aspect of the present invention, the intake air filter device according to the second or third aspect may include a fixture that detachably fixes the closure plate to the frame body through the guide member.

According to this configuration, the fixture can firmly fix the closure plate to the frame body, and the closure plate substantially hermetically covers the downstream-side surface of the frame body. Thus, the flow of the fluid can be blocked more effectively, so that the pressure difference (differential pressure) acting on the filter member to be replaced can be further reduced.

According to a seventh aspect of the present invention, the intake air filter device according to any one of the first to sixth aspects may further include a deck that is located on the lower side of the frame body and extends in the fluid flow direction from the downstream side of the frame body.

According to this configuration, a worker can easily perform maintenance work including disposing the closure plate on the downstream side of the frame body.

According to an eighth aspect of the present invention, the intake air filter device according to any one of the first to seventh aspects may include a mesh-like fence that is disposed in the intake air path on the downstream side and at a distance from the filter member.

According to this configuration, foreign substances etc. produced in the course of work can be prevented by the fence from flowing toward the downstream side of the intake air path and flowing into the gas turbine body.

According to a ninth aspect of the present invention, the intake air filter device according to any one of the first to eighth aspects may include a plurality of filter members; the plurality of filter members may be disposed in series in the direction in which a fluid flows through the intake air path; and the closure plate may be disposed on the downstream side of a filter member of the plurality of filter members that is located on the most downstream side in the fluid flow direction.

According to this configuration, the filter member replacement work can be performed simply by providing the closure plate on the filter member located on the most downstream side.

According to a tenth aspect of the present invention, in the intake air filter device according to any one of the second to ninth aspects, a plurality of the guide members may be disposed in an upper-lower direction, and the dimension of the guide member in the fluid flow direction may be different between adjacent ones of the guide members.

According to this configuration, the dimension in the fluid flow direction is different between adjacent ones of the guide members. Therefore, the closure plates inserted into these guide members do not interfere with each other. Thus, the closure plates of the adjacent filter members can be easily attached and detached.

According to an eleventh aspect of the present invention, a gas turbine includes the intake air filter device according to any one of the first to tenth aspects.

According to this configuration, a gas turbine that allows replacement of the filter member even during operation can be provided.

According to a twelfth aspect of the present invention, there is provided a filter replacement method of an intake air filter device with a filter member disposed in an intake air path of a gas turbine, the filter replacement method including: a closure plate disposing step of disposing a closure plate that covers a downstream-side surface of a filter member to be replaced disposed inside a frame body; a dismounting step of dismounting the filter member to be replaced, on which the closure plate has been disposed, from the frame body toward the upstream side of the intake air path; a mounting step of mounting a replacement filter member on the frame body, from which the filter member to be replaced has been dismounted in the dismounting step, from the upstream side of the intake air path; and a closure plate removing step of removing the closure plate from the frame body on which the replacement filter member has been mounted in the mounting step.

According to this method, it is possible to easily replace the filter member by stopping the flow of a fluid by the closure plate even when the fluid is flowing through the intake air path.

According to a thirteenth aspect of the present invention, in the filter replacement method of an intake air filter device according to the twelfth aspect, in the closure plate disposing step, the closure plate may be slid on the downstream side of the filter member to be replaced, in a direction intersecting a direction in which a fluid flows through the intake air path, so as to cover the downstream-side surface of the filter member.

According to this method, it is not necessary to move the closure plate in the opposite direction from the fluid flow direction when disposing the closure plate. In other words, the closure plate can be disposed without requiring a large force even when a fluid is flowing through the intake air path.

According to a fourteenth aspect of the present invention, in the filter replacement method of an intake air filter device according to the twelfth or thirteenth aspect, the intake air filter device may include a plurality of filter members; the plurality of filter members may be disposed in series in the direction in which a fluid flows through the intake air path; and in the closure plate disposing step, the closure plate may be disposed on the downstream side of a filter member of the plurality of filter members that is located on the most downstream side in the fluid flow direction.

According to this method, maintenance work of an intake air filter device including a plurality of filter members can also be performed by disposing the closure plate. Thus, the flow of a fluid can be blocked more effectively by the closure plate, so that the pressure difference (differential pressure) acting on the filter member to be replaced can be further reduced.

Advantageous Effects of Invention

According to the intake air filter device and the filter replacement method of an intake air filter device described above, it is possible, even during operation of the gas turbine, to replace the filter member in a simple manner without causing air leak from the space in which the filter member being replaced is housed.

DESCRIPTION OF EMBODIMENTS (First Embodiment)

In the following, an intake air filter device 90 and a filter replacement method of the intake air filter device 90 according to a first embodiment of the present invention will be described.

Figure 1:
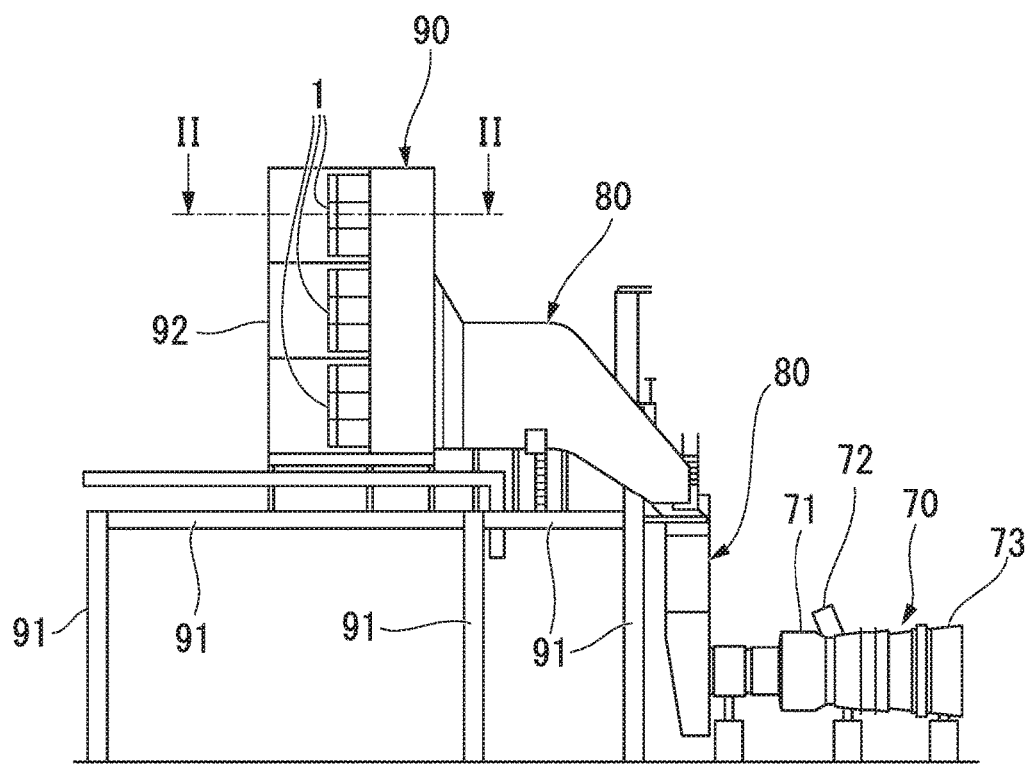
FIG. 1 is a side view of a gas turbine including an intake air filter device according to an embodiment of the present invention.

As shown in FIG. 1, a gas turbine 70 includes a compressor 71 that takes in and compresses air, a combustor 72 that produces combustion gas by combusting fuel in the compressed air, and a turbine 73 that is driven by the high-temperature, high-pressure combustion gas. The gas turbine 70 further includes the intake air filter device 90. The intake air filter device 90 removes foreign substances from air, which is a working fluid, and then supplies the air to the compressor 71.

As shown in FIG. 1, the intake air filter device 90 includes a building frame 92 forming an intake air path, a support structure 91 that supports the building frame 92 at a position off and above the ground, and a plurality of filter assemblies 1. The building frame 92 includes, on the outside and inside thereof, stairs, inlets, etc. that allow entry and exit of workers as well as carrying in and out of goods.

In this embodiment, the building frame 92 is configured as a three-story building. Specifically, the first floor is provided directly on the support structure 91, and the second and third floors are sequentially provided on top of the first floor. The building frame 92 being a three-story building is merely an example; the intake air filter device 90 may be installed on the ground, and the building frame 92 may have any number of stories.

The filter assembly 1 is provided inside each floor of the building frame 92. The intake air filter device 90 and the compressor 71 are connected to each other through an intake duct 80. Accordingly, air having flowed through the filter assembly 1 installed inside the building frame 92 is supplied to the gas turbine 70 by flowing through the inside of the intake duct 80.

Figure 2:
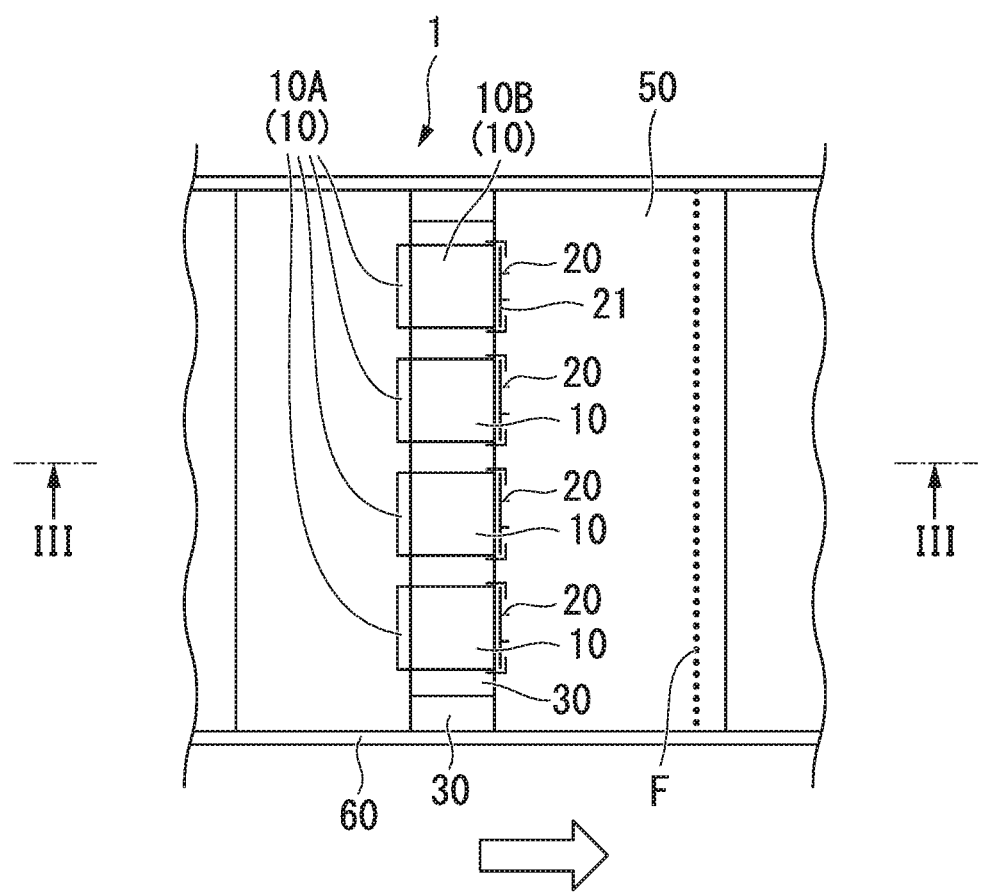
FIG. 2 is a sectional plan view (taken along the line II-II of FIG. 1) of a filter device according to a first embodiment of the present invention.

FIG. 2 is a schematic sectional view showing the section II-II of the intake air filter device 90 of FIG. 1. The arrow in FIG. 2 indicates the direction in which the fluid flows through the filter assembly 1. In the following description, the side from which the fluid flows and the side toward which the fluid flows will be referred to as the upstream side and the downstream side, respectively. The direction along the fluid flow direction will be referred to as the upstream-downstream direction. The filter assembly 1 serves as the intake air path through which the fluid is supplied to the gas turbine 70.

Figure 3:
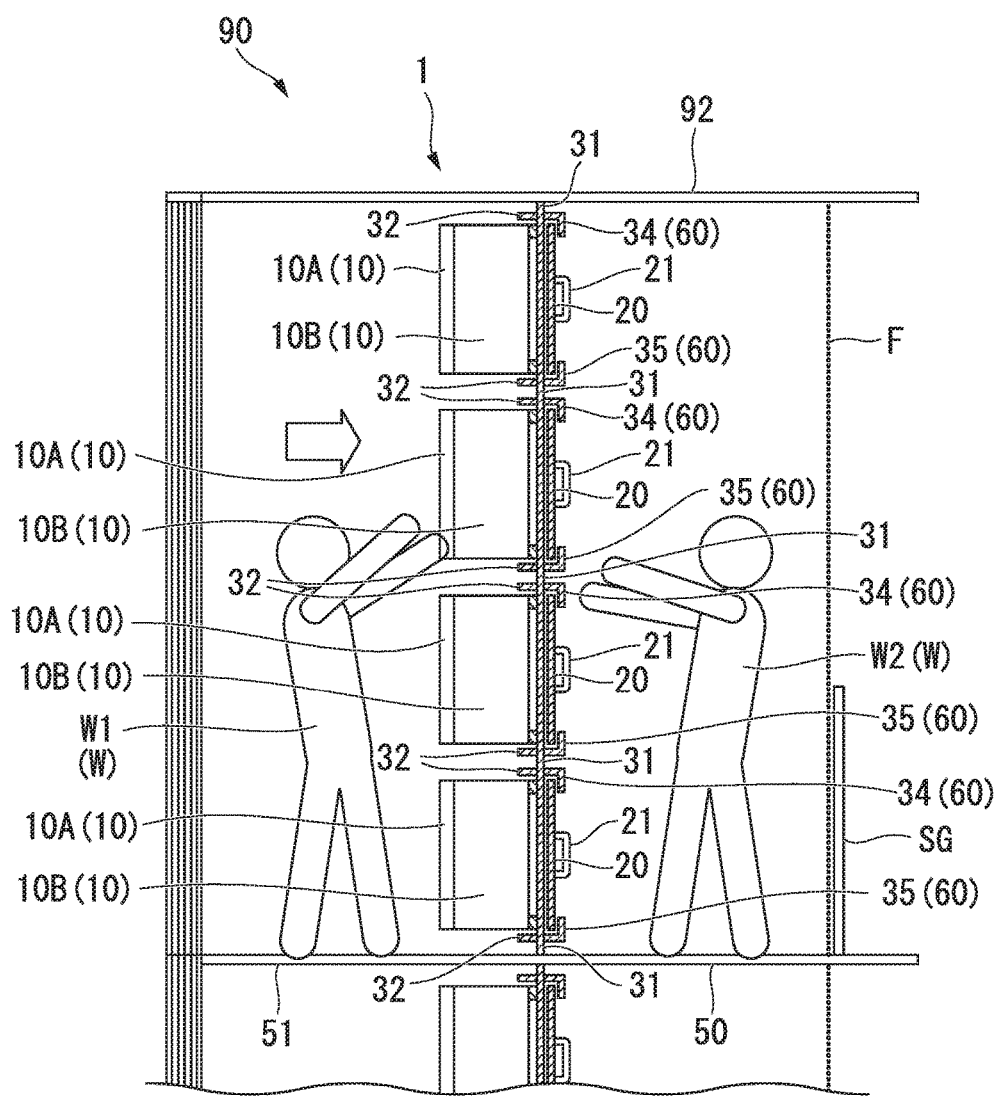
FIG. 3 is a sectional side view (taken along the line of FIG. 2) of the filter device according to the first embodiment of the present invention.

As shown in FIG. 2 and FIG. 3, the filter assembly 1 provided in each floor includes a plurality of filter members 10 that filter out foreign substances from the fluid taken in, a closure plate 20 that is provided on the downstream side of the filter member 10 during work and blocks the flow of the fluid through the filter member 10 in the upstream-downstream direction, a frame body 30 that supports the filter members 10 and the closure plate 20, fixing members 33 serving to mount the filter members 10 on the frame body 30, and guide members 60 (closure plate engaging parts) serving to fix the closure plate 20 to the frame body 30.

The filter member 10 includes a pre-filter member 10 that is provided on the upstream side and filters out large particles of dust from the fluid taken in, and a main filter member 10B that is provided in contact with the downstream-side surface of the pre-filter member 10A and filters out comparatively small particles of dust. The filter member 10 is made of a nonwoven fabric or the like with a small fiber diameter, and is also called a panel filter. The filter member 10 is composed of the pre-filter member 10A and the main filter member 10B connected in series, and the filter external surface except for the upstream- and downstream-side surfaces is surrounded by a filter casing 11.

Figure 4:
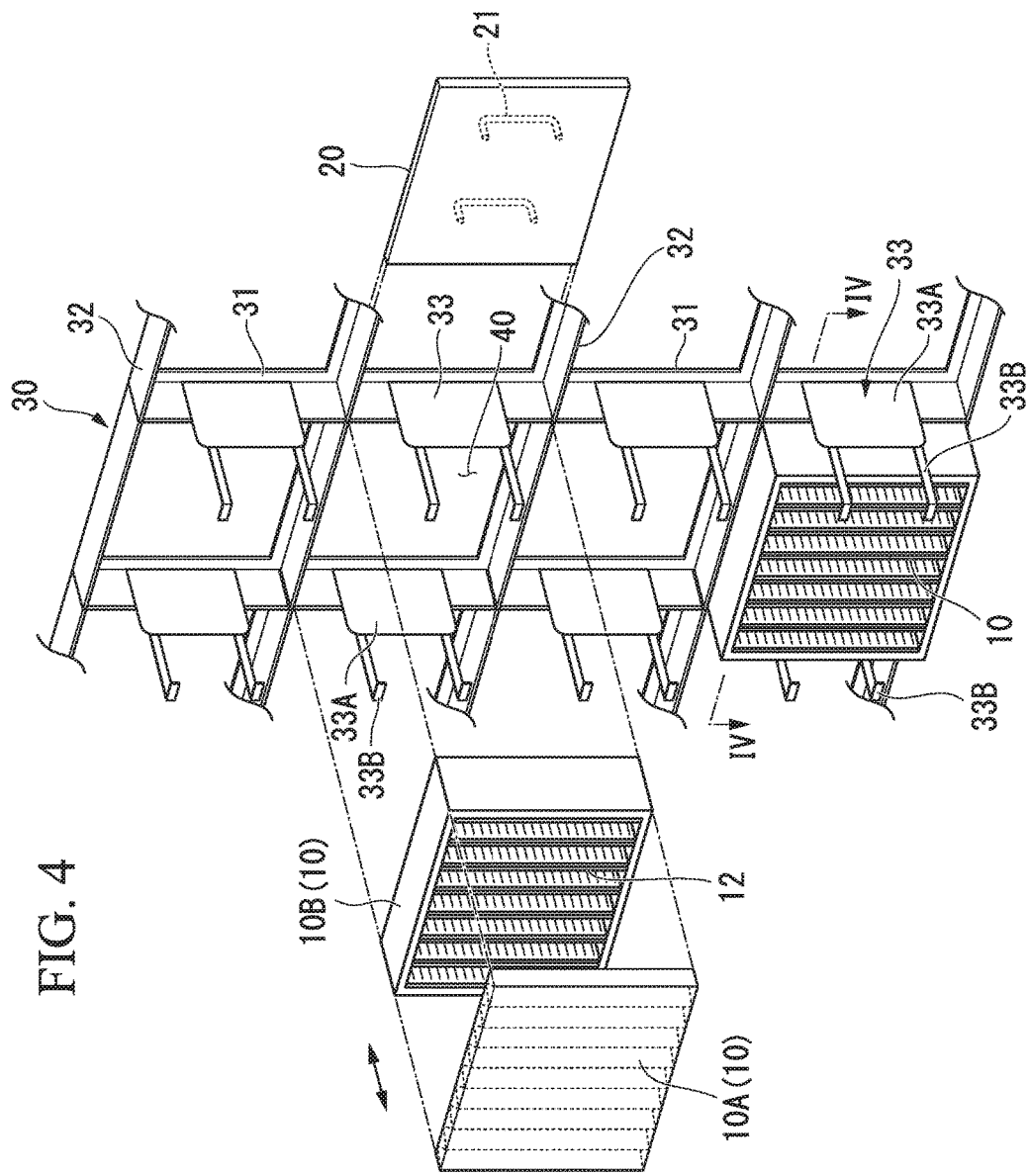
FIG. 4 is a developed perspective view of the major part of the intake air filter device according to the first embodiment of the present invention.

As shown in FIG. 4, a member having the form of a corrugated plate is mainly used as the pre-filter member 10A. The upstream-side surface and the downstream-side surface of the pre-filter member 10A communicate with each other so as to allow the flow of the fluid, and a filter medium 12 made of a nonwoven fabric or the like capable of capturing dust is placed on these surfaces.

The main filter member 10B is a filter member fixed to the downstream-side surface of the pre-filter member 10A. As with the pre-filter member 10A, the upstream-side surface and the downstream-side surface of the main filter member 10B communicate with each other so as to allow the flow of the fluid. The filter medium 12 is placed inside the main filter member 10B. The dimension of the main filter member 10B in the upstream-downstream direction is larger than that of the pre-filter member 10A. The main filter member 10B is a member that captures comparatively small particles of dust etc. that the pre-filter member 10A has failed to capture. That is, a nonwoven fabric or the like having a smaller fiber diameter and higher particle collection efficiency than the filter medium 12 of the pre-filter member 10A is used as the filter medium 12 of the main filter member 10B.

A so-called HEPA filter (high-efficiency particulate filter) or a semi-HEPA filter is suitably used as the main filter member 10B.

As shown in FIG. 2, FIG. 3, and FIG. 4, the closure plate 20 is a rectangular plate-like member that is provided to stop the flow of the fluid in the upstream-downstream direction by covering the downstream-side surface of the main filter member 10B during maintenance work of the intake air filter device 90. Grips 21 for a worker W to grip with hands for transfer, installation, etc. are provided on the downstream-side surface of the closure plate 20.

As shown in FIG. 2 and FIG. 4, the frame body 30 is disposed along the upstream-downstream direction (vertical direction) in each floor inside the building frame 92. The uppermost part and the lowermost part of the frame body 30 are fixed to the ceiling and the floor surface of each floor, and the filter members 10 are supported on the building frame 92 through the frame body 30. The frame body 30 has a plurality of vertical beams 31 extending in the upper-lower direction, a plurality of cross-beams 32 extending in the width direction, and the fixing members 33 that are fixed to the vertical beams 31 and clasp the filter members to prevent the filter members from falling onto the floor surface.

The vertical beams 31 and the cross-beams 32 are disposed so as to be orthogonal to each other. A region defined inside a pair of vertical beams 31 adjacent to each other in the width direction and a pair of cross-beams 32 adjacent to each other in the upper-lower direction serves as a filter housing part 40 in which one filter member 10 is housed.

The filter member 10 is inserted into the filter housing part 40 from the upstream side. The filter member 10 housed inside the filter housing part 40 is supported by one pair each of vertical beams 31 and cross-beams 32 in the upper-lower direction and the width direction so as to be unable to drop.

As shown in FIG. 2 and FIG. 3, each frame body 30 is configured to hold four filter members 10 in each of the upper-lower direction and the width direction that intersects the upper-lower direction. This number of the filter members 10 to be mounted is merely an example, to which the number is not limited.

Figure 5:
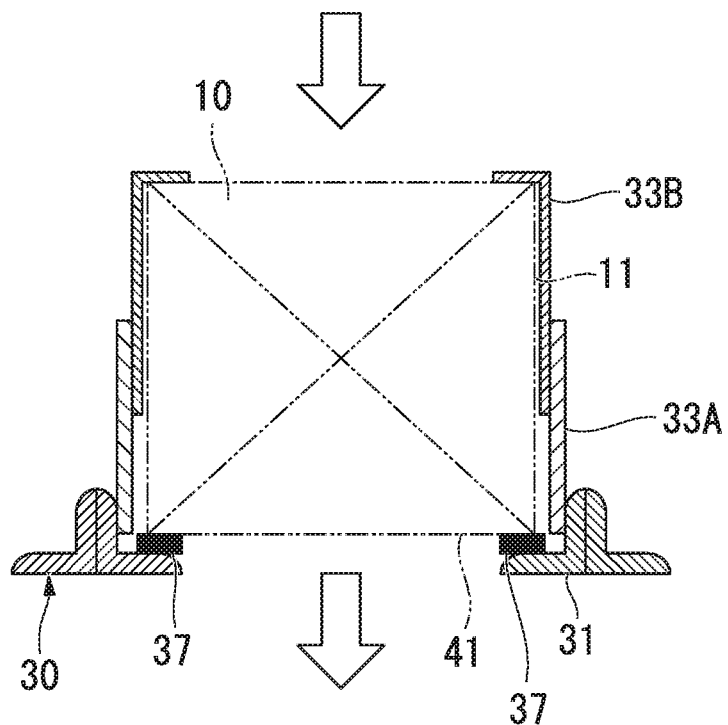
FIG. 5 is a sectional view (taken along the line IV-IV of FIG. 4) of a filter member, as mounted, according to the first embodiment of the present invention.

The fixing member 33 comes into contact with the peripheral edge of the filter member 10 and prevents the filter member 10 from dropping from the filter housing part 40 toward the upstream side. Specifically, as shown in FIG. 4 and FIG. 5, the fixing member 33 is composed of a partition plate 33A fixed to the vertical beam 31 and a fixture 33b fixed to the partition plate 33A. The partition plate 33A is a member partitioning the space between the filter members adjacent to each other in the width direction. The fixture 33B is a substantially L-shaped member, and has one side detachably mounted on the partition plate and the other side extended toward the upstream side to clasp and hold the filter member 10.

As shown in FIG. 5, the filter member 10 is supported on the vertical beams 31 through the partition plates 33A and the fixtures 33B, with a seal member 37 provided between the downstream-side end of the filter member 10 and the external surfaces of the vertical beams 31 and the cross-beams 32 facing the upstream side. The seal member 37 is provided along the entire periphery of the downstream-side end face of the filter casing 11 (downstream-side filter surface 41), and prevents air flowing through the inside of the filter device from bypassing the filter member 10 and flowing out through the clearance between the filter casing 11 and the frame body 30 (vertical beams 31, cross-beams 32) to a downstream-side deck 50.

Figure 6:
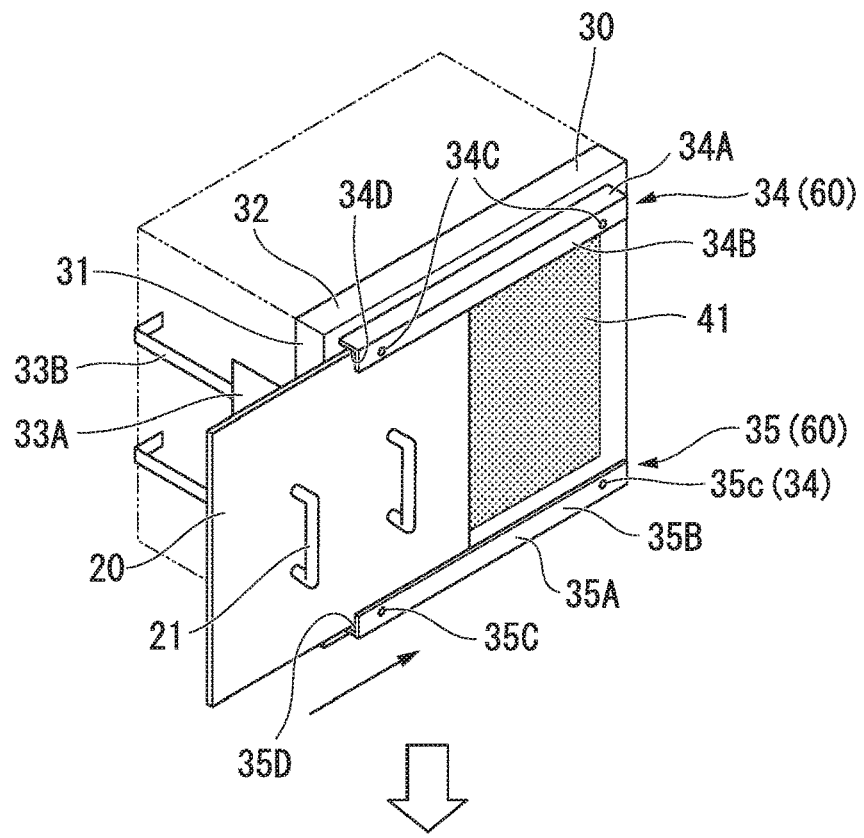
FIG. 6 is a view illustrating the step of disposing a closure plate according to the first embodiment of the present invention.
Figure 6:
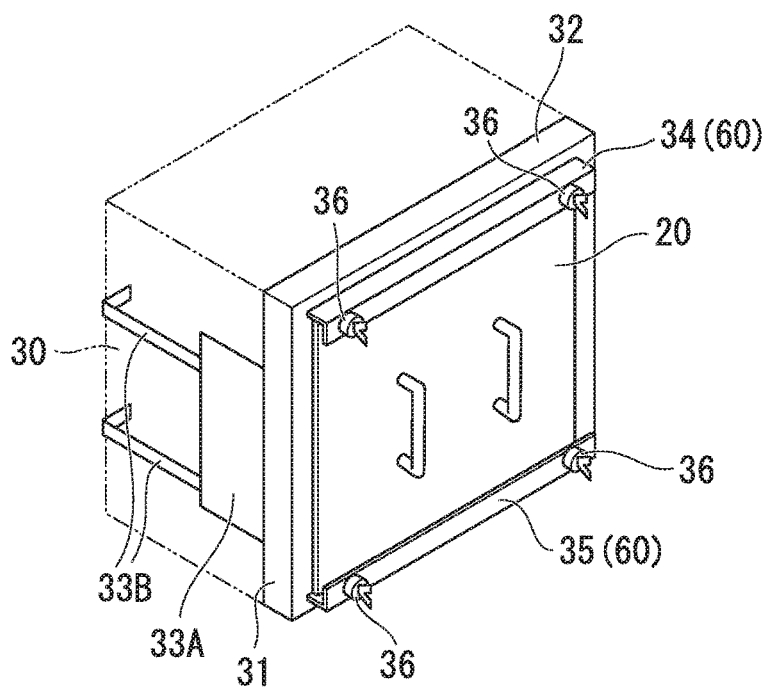

Next, the configuration on the downstream side of the frame body 30 will be described with reference to FIG. 6 and FIG. 7. As shown in FIG. 6, the downstream-side surface of the frame body 30 is the downstream-side filter surface 41 through which the downstream-side surface of the filter member 10 is exposed. The dimension of the closure plate 20 is set to be slightly larger than the dimension of the downstream-side filter surface 41 on the frame body 30 to be described later.

Guide members 60 that support the closure plate in the upper-lower direction are provided in the vicinity of the upper and lower edges of the downstream-side filter surface 41. The guide members 60 include a first support body 34 and a second support body 35. The first support body 34 is provided on the upper side of the downstream-side filter surface 41, while the second support body 35 is provided on the lower side of the downstream-side filter surface 41.

Specifically, a pair of guide members 60 composed of the first support body 34 and the second support body 35 are mounted on a mount surface (frame body 30) such that the sections assume an inverted L-shape, and are disposed as a pair of members that extend in the width direction orthogonal to the upstream-downstream direction, with the filter housing part 40 (filter member 10) therebetween. Grooves 34D, 35D capable of receiving the end edges of the closure plate 20 are formed between the guide members 60 and the mount surface (frame body 30). The groove 34D of the first support body 34 and the groove 35D of the second support body 35 face each other.

The section of the first support body 34 in the direction orthogonal to the extension direction thereof has a substantially inverted L-shape. The first support body 34 has an extension dimension slightly larger than the dimension of the downstream-side filter surface 41 in the width direction. Of the two plate-like parts composing the first support body 34 in the inverted L-shape, one plate-like part extending in the upstream-downstream direction forms a support surface 34A. The other plate-like part extending downward from the downstream-side end of the support surface 34A forms an engaging surface 34B. Screw holes 34C through which wing screws 36 (fixtures) to be described later are inserted are formed in the vicinity of both ends of the engaging surface 34B in the width direction. A spiral groove in the form of an internal thread is formed on the inner peripheral surface of the screw hole 34C, and the spiral groove engages with the wing screw 36 to be described later.

The second support body 35 is line-symmetric to the first support body 34 in the upper-lower direction. Specifically, the second support body 35 has a support surface 35A extending in the upstream-downstream direction and an engaging surface 35B extending upward from the downstream-side end of the support surface 35A. In addition, screw holes 35C into which the wing screws 36 are inserted are formed in the vicinity of both ends of the engaging surface 35B in the width direction. The grooves 34D, 35D are formed between the engaging surfaces 34B, 35B and the mount surface (frame body 30), and the support surfaces 34A, 35A form the bottom surfaces of the grooves 34D, 35D. The closure plate 20 is fixed to the frame body 30 by the first support body 34 and the second support body 35 thus formed.

During normal operation of the gas turbine, the closure plate 20 is kept dismounted from the intake air filter device 90. On the other hand, to replace the filter during operation of the gas turbine, the closure plate 20 is mounted on the frame body 30 (vertical beams 31, cross-beams 32) through the first support body 34 and the second support body 35. Specifically, when the filter member 10 is to be replaced during operation of the gas turbine, the pair of guide members 60 composed of the first support body 34 and the second support body 35 serve as the closure plate engaging parts to mount the closure plate 20 on the frame body 30.

As shown in FIG. 3, a fence F is provided on the downstream side from the filter assembly 1, at a position a predetermined distance away from the filter assembly 1. The fence F is a member with a plurality of open holes, communicating in the upstream-downstream direction, formed through the surface in a mesh-like pattern.

The downstream-side deck 50 on which the worker W passes or performs maintenance work is provided on the lower side of the filter assembly 1 between the filter assembly 1 and the fence F. The predetermined distance mentioned here means a distance that allows a sufficient space to be secured for the worker W to perform work etc. on the downstream-side deck 50, and the dimension of the distance is appropriately selected according to the design.

In addition, an upstream-side deck 51 is provided on the upstream side of the filter assembly 1, in the same plane as the downstream-side deck 50 in the height direction.

Next, a method of replacing the filter member 10 of the filter assembly 1 according to this embodiment will be described with reference to FIG. 3 to FIG. 7. In the following example, as shown in FIG. 3, the replacement work of the filter member 10 is performed by a first worker W1 who replaces the filter member 10 on the upstream side of the filter assembly 1 and a second worker W2 who installs and removes the closure plate 20 on the downstream side. The gas turbine 70 remains in operation throughout the replacement work. That is, the fluid is flowing from the upstream side toward the downstream side in the upstream-downstream direction of the filter assembly 1.

First, the first worker W1 and the second worker W2 prepare for the work on the upstream-side deck 51 and the downstream-side deck 50, respectively.

Then, a closure plate disposing step proceeds as follows. As shown in FIG. 3 and FIG. 6, first, the second worker W2 on the downstream-side deck 50 inserts one end edge in the width direction of the closure plate 20 along the grooves 34D, 35D from one of both ends of the first support body 34 and the second support body 35. More specifically, the end edge of the closure plate 20 is inserted so as to be slid along the gaps (grooves 34D, 35D) formed between the engaging surface 34B of the first support body 34 and the downstream-side filter surface 41, and between the engaging surface 35B of the second support body 35 and the downstream-side filter surface 41. Subsequently, the closure plate 20 is inserted until the closure plate 20 covers the whole surface of the downstream-side filter surface 41. In this state, the closure plate 20 is supported by the first support body 34 (guide member 60) and the second support body 35 (guide member 60) so as to be movable in the direction intersecting the fluid flow direction.

Figure 7:
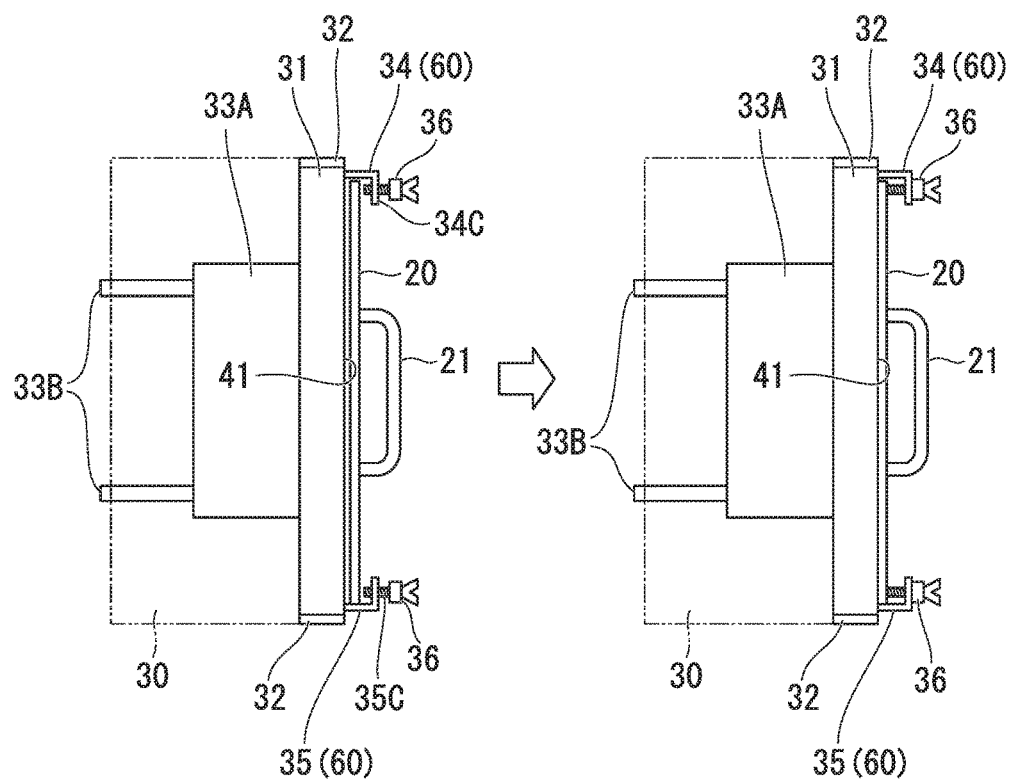
FIG. 7 is a view illustrating the step of fixing the closure plate according to the first embodiment of the present invention.

Next, as shown in the view on the left side of FIG. 7, the wing screws 36 are screwed into the screw holes 34C, 35C of the first support body 34 and the second support body 35. As shown in this view, in this state, there is a slight gap between the closure plate 20 and the downstream-side filter surface 41.

As shown in the view on the right side of FIG. 7, the wing screws 36 are screwed further in until the closure plate 20 comes into contact with the downstream-side filter surface 41 without a gap therebetween. Thus, the closure plate disposing step is completed.

Next, on the upstream-side deck 51 shown in FIG. 3, the first worker W1 dismounts the filter member 10 to be replaced, i.e., the filter member 10 on which the closure plate 20 has been disposed in the closure plate disposing step, from the frame body 30. More specifically, the first worker W1 dismounts the filter member 10 to be replaced by sliding the filter member 10 from the frame body 30 toward the upstream side of the intake air path.

In the state where the gas turbine 70 is in operation and the fluid is continuously flowing from the upstream side toward the downstream side of the filter assembly 1, if the closure plate 20 is not provided, it would be difficult to dismount the filter member 10 as follows. That is, a pressure difference (differential pressure) acts on the filter member 10 in a direction away from the first worker W1 (i.e., the direction toward the downstream side) as seen from the side of the first worker W1. Accordingly, to dismount the filter member 10 toward the upstream side, a force exceeding the pressure difference (differential pressure) needs to be exerted on the filter member 10.

However, in this embodiment, since the downstream-side filter surface 41 of the filter member 10 is covered by the closure plate 20, the fluid inside the intake air path does not flow through the filter member 10. Therefore, the force due to the above pressure difference (differential pressure) does not act on the filter member 10 as seen from the first worker W1, so that the filter member 10 can be easily dismounted toward the upstream side.

Thus, the dismounting step of dismounting the filter member 10 is completed.

Subsequently, a new replacement filter member 10 is mounted on the frame body 30 (filter housing part 40) from which the filter member 10 to be replaced has been dismounted in the dismounting step. To mount the replacement filter member 10, the filter member 10 is inserted into the filter housing part 40 so as to be slid from the upstream side of the filter assembly 1.

Thus, the mounting step of mounting the replacement filter member is completed.

Then, the second worker W2 removes the closure plate 20 from the downstream-side filter surface 41 of the filter housing part 40 for which the mounting step has been completed. To remove the closure plate 20, the closure plate disposing step is performed in reverse order.

First, the wing screws 36 fixing the closure plate 20 to the frame body 30 are loosened. As a result, the closure plate 20 is slightly separated from the downstream-side filter surface 41 so as to be movable in the width direction. Next, the second worker W2 slides the closure plate 20 to one side in the width direction, and removes the closure plate 20 from the first support body 34 and the second support body 35. From which side in the width direction the closure plate 20 should be removed is determined on the basis of the positional relation between the filter housing part 40 and the surrounding structure or of the convenience of the worker, and the direction is not limited to a certain one direction in this step.

Thus, the closure plate removing step is completed, and thereby the replacement (replacement method) of the filter member 10 in the intake air filter device 90 according to this embodiment is completed.

As has been described above, the intake air filter device 90 according to this embodiment can block the flow of the fluid by the closure plate 20, so that the inflow of foreign substances into the compressor 71 etc. on the downstream side can be prevented even during replacement of the filter member 10. Moreover, the pressure difference (differential pressure) acting on the filter member 10 to be replaced can be reduced.

Accordingly, the filter member 10 can be replaced even when the gas turbine 70 is in operation.

Furthermore, being able to replace the filter member 10 even during operation of the gas turbine 70 has an economic advantage, too. That is, in the case where the gas turbine 70 is stopped to replace the filter member 10, it is necessary to replace the filter member 10 by way of precaution at a periodical inspection etc. even if the filter member 10 still functions adequately. In other words, the filter member 10 needs to be replaced with a new filter member 10 before the service life of the filter member 10 expires.

However, according to the above embodiment, the filter member 10 can be replaced during operation of the gas turbine 70, which makes it possible to replace the filter member 10 with a new filter member 10 sequentially after using the filter member 10 until just before the expiration of the service life.

In addition, in the intake air filter device 90 according to the embodiment, the closure plate 20 is supported by the guide members 60 so as to be movable in the direction intersecting the direction in which the fluid flows through the intake air path.

According to this configuration, to bring the closure plate 20 closer to the frame body 30, the closure plate 20 can be moved in the direction intersecting the fluid flow direction. In this way, even when the fluid is flowing through the intake air path, the closure plate can be disposed without requiring a large force. Thus, the filter member 10 can be replaced even when the gas turbine 70 is in operation.

The intake air filter device 90 according to the embodiment includes the fixtures (wing screws 36) that detachably fix the closure plate 20 to the frame body 30 through the guide members 60. In this way, the wing screws 36 can firmly fix the closure plate 20 to the frame body 30. Accordingly, the closure plate 20 substantially hermetically covers the downstream-side filter surface 41 of the frame body 30. Thus, the flow of the fluid can be blocked more effectively, so that the pressure difference (differential pressure) acting on the filter member 10 to be replaced can be further reduced.

In addition, the closure plate 20 is moved in the direction of coming closer to the frame body 30 simply by fastening the wing screws 36. Accordingly, the force required to dispose the closure plate 20 on the frame body 30 is reduced.

The intake air filter device 90 according to the embodiment has the downstream-side deck 50 on the downstream side of the filter members 10. According to this configuration, the worker W can easily reach the downstream side of the filter members 10. Thus, the worker W can easily perform maintenance work including disposing the closure plate 20 on the downstream side of the frame body 30.

The intake air filter device 90 according to the embodiment has the fence F provided on the downstream side from the filter members 10. According to this configuration, foreign substances, such as screws, that are produced in the course of work can be prevented by the fence F from flowing toward the downstream side of the intake air path and flowing into the compressor 71.

The intake air filter device 90 according to the embodiment of the present invention has the plurality of filter members 10 disposed in series in the fluid flow direction, and the filter member 10 to be provided with the closure plate 20 is disposed on the most downstream side in the fluid flow direction. According to this configuration, it is possible to more effectively reduce the pressure difference (differential pressure) acting on the filter member 10 to be replaced by providing the closure plate 20 on the filter member 10 located on the most downstream side on which the largest differential pressure occurs in the upstream-downstream direction. In other words, the pressure difference (differential pressure) can be reduced more effectively than when the closure plate 20 is disposed on the filter member 10 located on the upstream side.

According to the filter replacement method of the intake air filter device 90 according to the embodiment of the present invention, it is possible to more easily replace the filter member 10 by stopping the flow of the fluid by the closure plate 20 even when the fluid is flowing through the intake air path.

In addition, it is not necessary to move the closure plate 20 in the opposite direction from the fluid flow direction when disposing the closure plate 20. In other words, the closure plate 20 can be disposed without requiring a large force even when the fluid is flowing through the intake air path.

Moreover, according to this method, maintenance work can also be performed on the filter assembly 1 including the plurality of filter members by disposing the closure plate 20. Accordingly, the flow of the fluid can be more effectively blocked by the closure plate 20, so that the pressure difference (differential pressure) acting on the filter member 10 to be replaced can be further reduced.

As shown in FIG. 3, a safety handrail SG may be provided on the downstream side so as to be adjacent to the fence F provided at the downstream-side end of the downstream-side deck 50. With the safety handrail SG provided, fall of the worker W2 from the downstream-side deck 50 can be prevented.

In the above embodiment, the example in which the pre-filter 10A and the main filter member 10B are provided in contact with each other has been described. However, the configuration of the filter member 10 is not limited to this example, and the pre-filter member 10A and the main filter 10B may be disposed at a distance from each other in the fluid flow direction.

(Second Embodiment)

An intake air filter device 90 and a filter member replacement method of the intake air filter device 90 according to a second embodiment of the present invention will be described below. While the first embodiment is an embodiment relating to the intake air filter device 90 that employs panel filters, the intake air filter device 90 according to the second embodiment employs pulse filters instead of panel filters. In the following, only those parts of the structure and the method that are different from the first embodiment will be described, while the same reference signs and names are used for the same parts of the structure and the method to omit the detailed description thereof. A pulse filter refers to a filter that has a back-washing function of blowing off powder dust adhering to the filter outer surface by instantaneously injecting pulsed compressed air into the filter.

Figure 8:
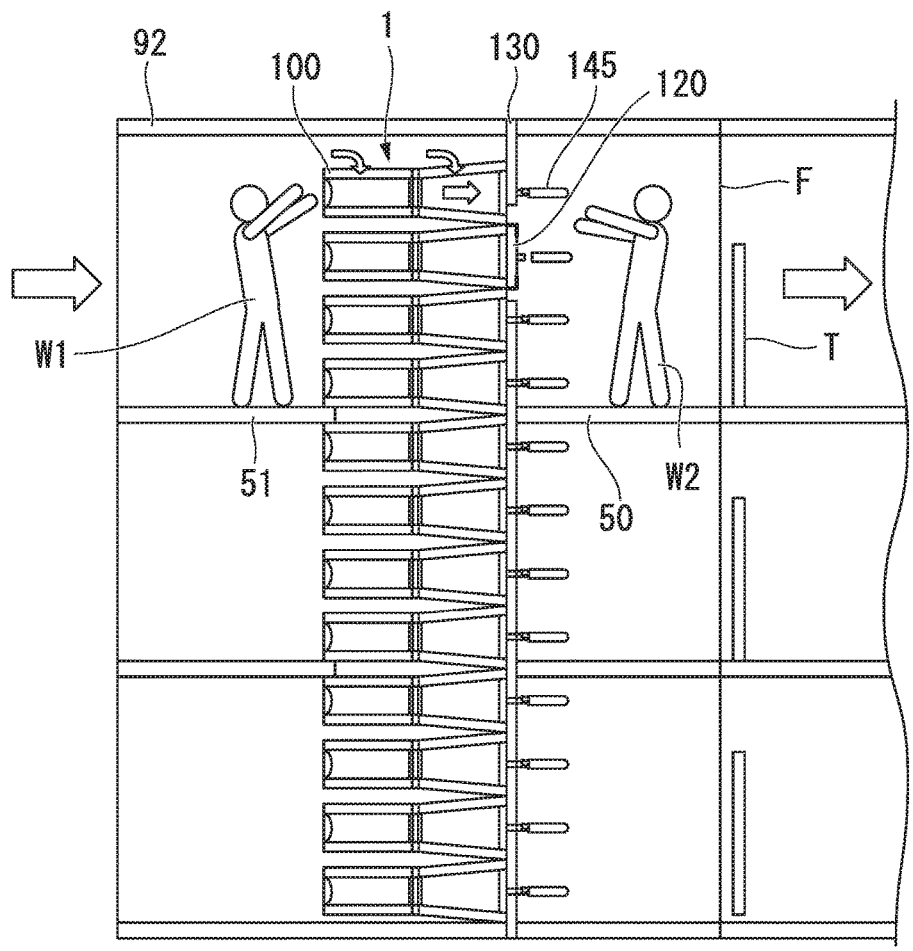
FIG. 8 is a sectional side view of a filter device according to a second embodiment of the present invention.

FIG. 8 is a schematic side view of the intake air filter device employing the pulse filters. It is the same as in the first embodiment that the intake air filter device 90 is housed inside the three-story building frame 92 and supported by the support structure 91. In the example shown in FIG. 8, the building frame 92 has three stories, but the building frame 92 is not limited to this example. As in the first embodiment, a frame body 130 is disposed in each floor inside the building frame 92. The uppermost part and the lowermost part of the frame body 130 are fixed to the ceiling and the floor surface of each floor, and filter members 100 are supported on the building frame 92 through the frame body 130.

Figure 9:
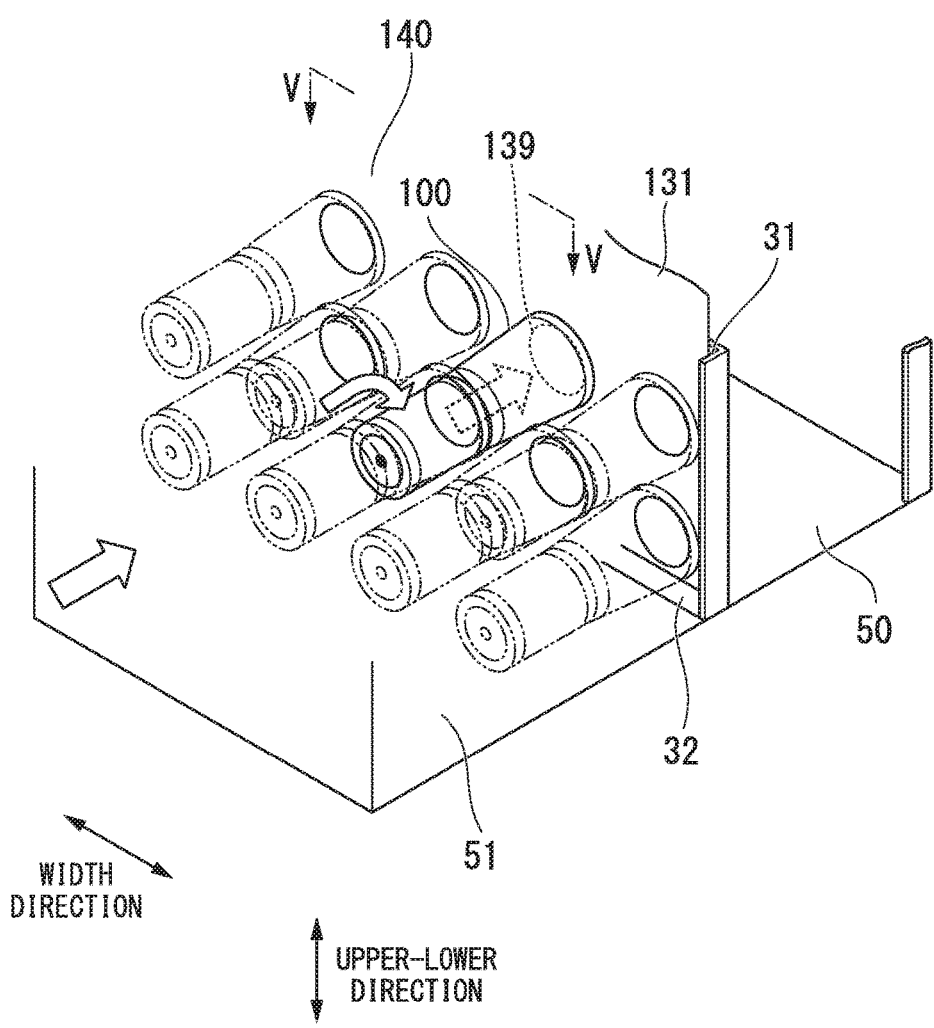
FIG. 9 is a perspective view of a filter member according to the second embodiment of the present invention.

FIG. 9 is a perspective view showing a part of the intake air filter device 90 according to a first aspect of the second embodiment. A filter housing part 140 in which the filter members 100 are disposed is defined by the plurality of vertical beams 31 extending in the upper-lower direction (vertical direction) and the plurality of cross-beams 32 extending in the width direction of the frame body 130, and a tube sheet 131 supporting the filter members 100. Specifically, the plate-like tube sheet 131 is attached inside the filter housing part 140, which defines a rectangular space surrounded by the vertical beams 31 extending in the upper-lower direction and the cross-beams 32 extending in the width direction, so as to cover the opening of the filter housing part 140 open in the upstream-downstream direction. The vertical beams 31 and the cross-beams 32 may be flat plate members, or may be steel sections, such as H-sections or L-sections. The tube sheet 131 and the vertical beams 31 and the cross-beams 32 are fixed to each other by welding etc., and constitute such a structure that air does not leak from the upstream-side deck 51 toward the downstream-side deck 50.

As shown in FIG. 9, a large number of tubular filter members 100 are disposed in the upstream-downstream direction and fixed to the tube sheet 131. The tube sheet 131 on which the filter members 100 are mounted has openings 139 in the upstream-downstream direction that are concentric with the filter members 100.

The structure of the filter member 100 according to the second embodiment will be described using FIG. 10. The filter member 100 is composed of a tubular inner perforated plate 100A disposed on the upstream side, an outer perforated plate 100B disposed on the downstream side of the inner perforated plate 100A so as to cover the inner perforated plate 100A, and a filter medium 112 packed inside the space between the inner perforated plate 100A and the outer perforated plate 100B. The inner perforated plate 100A and the outer perforated plate 100B are members obtained by forming a perforated plate, with a large number of through-holes 101 provided in the surface, into a cylindrical shape, and allow air to flow therethrough. The filter medium 112 is composed of a corrugated nonwoven fabric or the like formed into a cylindrical shape. Powder dust, dirt, etc. in the air are captured by the filter medium 112.

The filter member 100 composed of the inner perforated plate 100A, the outer perforated plate 100B, and the filter medium 112 is integrally formed as a set of filter element, and is integrally mounted and dismounted.

Figure 10:
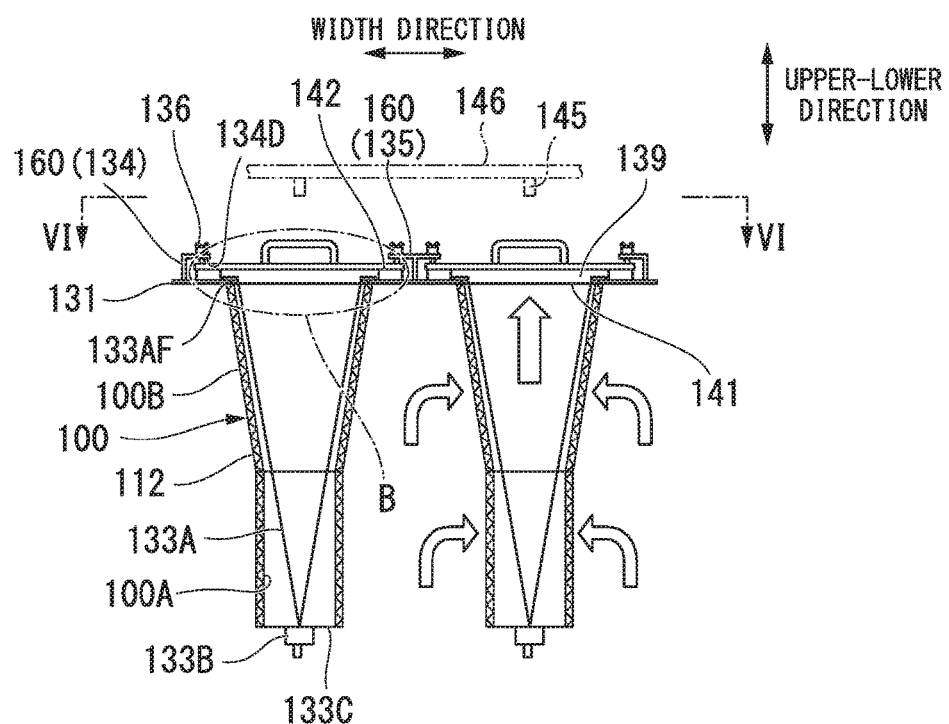
FIG. 10 is a view (taken along the line V-V of FIG. 9) showing the structure around the filter member in the width direction according to the second embodiment of the present invention.
Figure 11:
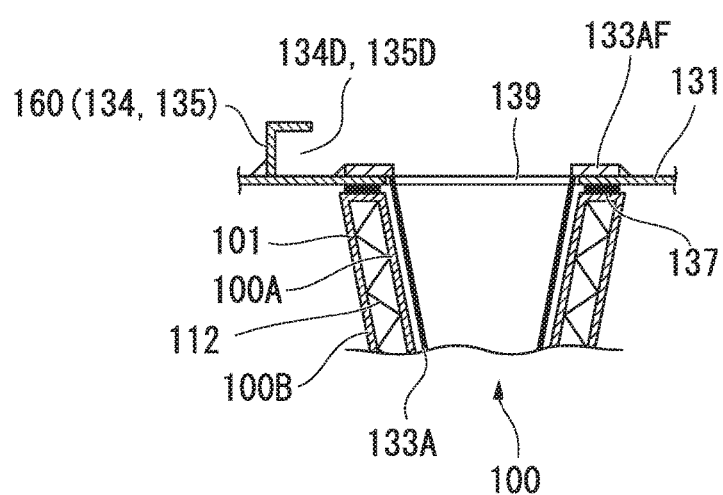
FIG. 11 is a view (detail of the part B of FIG. 10) showing the structure of the filter according to the second embodiment of the present invention.

As shown in FIG. 10, the filter member 100 is mounted on the tube sheet 131 through a fixing member 133. The fixing member 133 is composed of a rod 133A that retains the filter member 100 from the inside of the filter member 100, a fastener 133B that fixes the filter member 100 to the tube sheet 131 through the rod 133A, and a lid member 133C provided at the upstream end of the rod 133A. The rod 133A has the form of a plurality of rod members bundled together. The upstream-side ends of the rod members are bundled together and integrated, while the other ends spread apart from one another toward the downstream side, with a flange 133AF provided at the end. As shown in FIG. 11, the rod 133A having the flange 133AF is inserted into the opening 139 from the upstream side, and the flange 133AF is fixed to the tube sheet 131 by welding etc. in the vicinity of the inner peripheral edge of the opening 139. For example, in the example shown in FIG. 12, the rod 133A is composed of three rod members. When the filter member 100 is seen from the upstream-downstream direction, the three rod members of the rod 133A are disposed on the outer periphery of the filter member 100 at about 120° intervals. The rod 133A reinforces the filter member 100 such that the inner perforated plate 100A is not depressed radially inward. At least three rod members of the rod 133A should be provided.

As shown in FIG. 11, the rod 133A is fixed to the tube sheet 131 by welding etc. at the flange 133AF provided at the end. A seal member 137 is inserted between the filter member 100 and the tube sheet 131. Since the seal member 137 is disposed along the entire periphery of the contact surfaces of the filter member 100 and the tube sheet 131, the seal member 137 is compressed in the upstream-downstream direction as the fastener 133B mounted at the upstream end of the rod 133A is fastened. As a result, the sealing property of the seal member 137 is maintained, and air supplied into the filter device 90 flows to the inside of the outer perforated plate 100B without bypassing the filter member 100.

That is, air having flowed into the filter device 90 enters inside the filter member 100 through the large number of through-holes 101 provided in the outer perforated plate 100B. The air from which powder dust, dirt, etc. have been removed by the filter medium 112 passes through the through-holes 101 provided in the inner perforated plate 100B into the internal space of the filter member 100, and moves further toward the downstream side before being discharged through the opening 139 toward the downstream-side deck 50.

As shown in FIG. 10, the upstream-side part of the filter member 100 mounted on the tube sheet 131 has a cylindrical shape, while the part from the middle to the downstream side has a conical shape, so that the filter member 100 as a whole has a tubular shape. In the state of the filter member 100 being mounted on the tube sheet 131, the inner diameter of the inner perforated plate 100A at the downstream-side end is substantially equal to the diameter of the opening 139 formed in the tube sheet 131.

As shown in FIG. 10, cleaning nozzles 145 for filter back-washing are installed on the deck 50 on the downstream side from the filter members 100. The cleaning nozzles 145 are disposed at the same positions in the upper-lower direction and the width direction as the centers of the openings 139 of the respective filter members 100, with a predetermined distance kept to the filter members 100 in the direction toward the downstream side so as not to interfere with the attachment and detachment of a closure plate 120. The compressed air supplied to the cleaning nozzles 145 is supplied through an air supply pipe 146.

Figure 12:
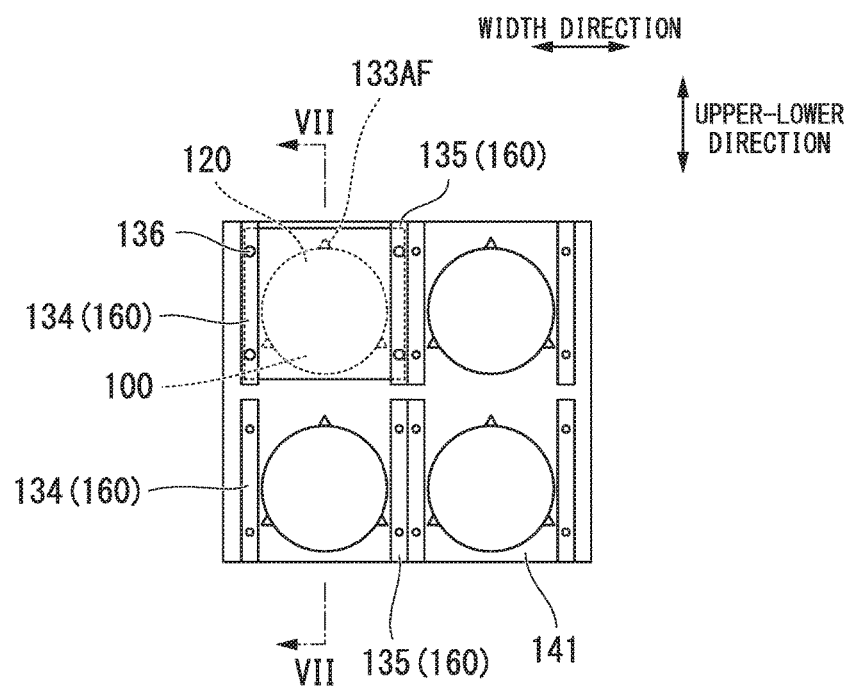
FIG. 12 is a plan view (taken along the line VI-VI of FIG. 10), from the downstream side, of a closure plate of the filter member according to the second embodiment of the present invention.

Next, the configuration on the downstream side of the filter member 100 will be described. As in the first embodiment, to replace the filter member 100 during operation of the gas turbine, the closure plate 120 needs to be mounted on the filter member 100 in advance. Specifically, as shown in FIG. 10 and FIG. 12, guide members 160 that guide the closure plate 120 are disposed in the vicinity of the edges on both sides in the width direction of the filter member 100 (downstream-side filter surface 41). The guide members 160 are composed of a first support body 134 and a second support body 135 located one on each side of the filter member 100 in the width direction. It is the same as in the first embodiment that the guide members 160 are fixed to the frame body 130 (tube sheet 131) by fixtures 136, such as wing screws.

Specifically, the pair of guide members 160 (first support body 134, second support body 135) are mounted on the mount surface (tube sheet 131) such that the sections assume an inverted L-shape. Grooves 134D, 135D capable of receiving the end edges of the closure plate 120 are formed between the guide members 160 and the mount surface (tube sheet 131). The grooves 134D, 135D face each other across the filter member 100.

When the closure plate 120 is mounted on the tube sheet 131, a filler 142, such as a packing, is disposed between the closure plate 120 and the tube sheet 131. Here, when mounting the closure plate 120 on the tube sheet 131, it is possible that, due to interference of the flange 133AF of the fixing member 133, the closure plate 120 cannot be brought into close contact with the tube sheet 131 and a gap is left between the closure plate 120 and the tube sheet 131. To avoid the situation where the filter member replacement work cannot be performed due to air leaking through this gap toward the downstream side, the filler 142, such as a packing, is disposed on the outer periphery on the rear side of the closure plate 120 between the closure plate 120 and the tube sheet 131. The closure plate 120 can be mounted on the tube sheet 131 through the filler 142 by fastening the fixtures 136. The filler 142 may be attached to the rear side of the closure plate 120.

Next, the guide members 160 in the case where the closure plates 120 are mounted on the filter members 100 disposed in the upper-lower direction (vertical direction) shown in FIG. 12 will be described. In the case of the adjacent filter members 100 disposed in the width direction (left-right direction) shown in FIG. 12, the first support bodies 134 and the second support bodies 135 constituting the guide members 160 are disposed in the width direction (left-right direction) with the respective filter members 100 therebetween, and are disposed at the same height from the surface of the tube sheet 131 (the groove widths of the grooves 134D, 135D are the same).

However, in FIG. 12, in the case where the filter members 100 are disposed so as to be adjacent to each other in the upper-lower direction, if the first support bodies 134 and the second support bodies 135 are installed at the same height (the same height from the surface of the tube sheet 131), when inserting the closure plate 120 into the groove 134D of the first support body 134 or the groove 135D of the second support body 135, it is possible that the closure plate 120 cannot be inserted due to interference with the first support body 134 or the second support body 135 of the adjacent filter member 100.

Figure 13:
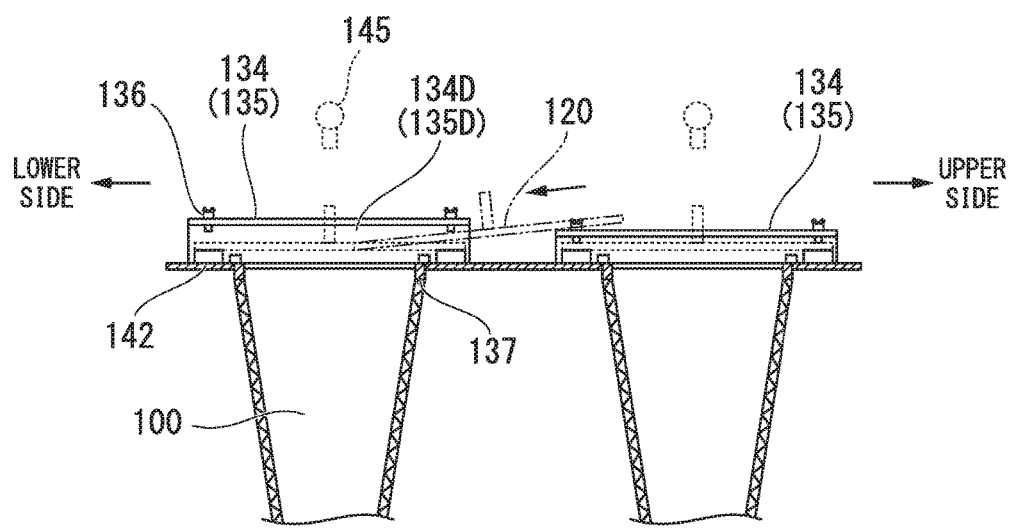
FIG. 13 is a view (taken along the line VII-VII of FIG. 12) showing the structure of the filter in the upper-lower direction according to the second embodiment of the present invention.

Therefore, as shown in FIG. 13, in the case of the filter members 100 disposed in the upper-lower direction, i.e., in the case of the first support bodies 134 and the second support bodies 135 adjacent to each other in the upper-lower direction, the first support bodies 134 and the second support bodies 135 are installed such that the groove widths (equivalent to the heights from the surface of the tube sheet 131) of the grooves 134D, 135D are different between the adjacent support bodies. According to this arrangement, like the closure plate 120 indicated by the two-dot chain line, the closure plate 120 can be inserted into the groove 134D of the first support body 134 or the groove 135D of the second support body 135 from an oblique direction indicated by the arrow.

Next, a replacement method of the filter member 100 according to the second embodiment will be described using FIG. 8 to FIG. 10. Only those steps that are different from the first embodiment will be described, while description will be omitted where the same steps are applicable. In this embodiment, the structure for mounting the filter member 100 on the frame body 130 (tube sheet 131) and the mounting step are different from those of the first embodiment. That is, except that the dismounting step and the mounting step of the filter member 100 are different, the procedure of the closure plate disposing step, the closure plate removing step, etc. is the same as in the first embodiment. For example, the closure plate disposing step in which the second worker W2 on the downstream-side deck 50 mounts the closure plate 120 on the guide members 160 (first support body 134, second support body 135) fixed to the frame body 130 (tube sheet 131), and the closure plate removing step in which the second worker W2 removes the closure plate 120 from the guide members 160 are the same as in the first embodiment.

The dismounting step and the mounting step of the filter member 100 according to the second embodiment will be described below. As shown in FIG. 10 to FIG. 12, after it is confirmed that the closure plate 120 has been mounted on the frame body 130 (tube sheet 131), the fastener 133B mounted at the upstream end of the rod 133A is dismounted. When the fastener 133B is dismounted, the set of filter member 100 composed of the inner perforated plate 100A, the outer perforated plate 100B, and the filter medium 112 can be integrally pulled out and dismounted from the rod 133A toward the upstream side. This action completes the dismounting step of the filter member 100.

Next, a new replacement filter member 100 composed of the inner perforated plate 100A, the outer perforated plate 100B, and the filter medium 112 is inserted into the rod 133A from the upstream side and fastened with the fastener 133B. As a result of this action, the filter member 100 is mounted on the tube sheet 131, and the mounting step of the filter member 100 is completed. The procedure of the rest of the replacement method is the same as in the first embodiment.

The filter member 100 is easy to replace, since the filter member 100 can be easily dismounted and mounted through the attachment and detachment of the fastener 133B of the fixing member 133 (rod 133A) fixed by welding to the tube sheet 131.

In the second embodiment, the filter member 100 has been described as mounted in the horizontal direction, but instead the filter member 100 may be mounted in the vertical direction. Specifically, the filter member 100 may be mounted from the lower side in the vertical direction on the tube sheet 131 that is installed in a horizontal plane.

While the embodiments of the present invention have been described in detail with reference to the drawings, the configurations and the combinations thereof in the above embodiments are merely examples; modifications, such as addition, omission, and substitution, can be made to the configurations within the scope of the present invention.

For example, in the above embodiment, the example of using wing screws as the fixtures 36 for fixing the closure plate 20 to the guide members 60 has been described. However, the fixture 36 is not limited to this example, and various means can be adopted according to the design or convenience.

In the above embodiments, the example of replacing the filter members 10, 100 while the gas turbine 70 is in operation has been described. However, the filter members 10, 100 may be replaced after the gas turbine 70 is stopped.

INDUSTRIAL APPLICABILITY

The intake air filter device and the filter replacement method of an intake air filter device described above can be applied to gas turbines, for example. According to the above configurations, it is possible, even during operation of the gas turbine, to replace the filter member in a simple manner without causing air leak from the space in which the filter member being replaced is housed.

REFERENCE SIGNS LIST

1 Filter assembly
10, 100 Filter member
10A Pre-filter member
10B Main filter member
11 Filter casing
12, 112 Filter medium
20, 120 Closure plate
21, 121 Grip
30, 130 Frame body
31 Vertical beam
32 Cross-beam
33, 133 Fixing member
34, 134 First support body
35, 135 Second support body
34A, 35A, 134A, 135A Support surface
34B, 35B, 134B, 135B Engaging surface
34C, 35C, 134C, 135C Screw hole
34D, 35D, 134D, 135D Groove 36, 136 Fixture (wing screw)
37, 137 Seal member
40, 140 Filter housing part
41, 141 Downstream-side filter surface
50 Downstream-side deck
51 Upstream-side deck
60, 160 Guide member
70 Gas turbine
71 Compressor
72 Combustor
73 Turbine
80 Intake duct
91 Support structure
90 Intake air filter device
92 Building frame
100A Inner perforated plate
100B Outer perforated plate
101 Through-hole
131 Tube sheet
133A Rod
133AF Flange
133B Fastener
133C Lid member
139 Opening
142 Filler
145 Cleaning nozzle
146 Air supply pipe
F Fence
W Worker
W1 First worker
W2 Second worker
T Safety handrail

The invention claimed is:

1. An intake air filter device with a filter member in an intake air path of a gas turbine, the intake air filter device comprising:
   a frame body that supports the filter member which is configured to be inserted thereinto from an upstream side in a direction in which a fluid is to flow through the intake air path; and
   a closure plate engaging part mounted on a downstream side of the frame body and serving to engage a closure plate that covers a downstream side of the filter member.

2. The intake air filter device according to claim 1, wherein the closure plate engaging part includes a guide member that supports the closure plate so as to be movable in a direction intersecting the direction in which the fluid is to flow through the intake air path.

3. The intake air filter device according to claim 2, further comprising a pair of guide members positioned on respective sides of the filter member, wherein each of the pair of guide members has a groove capable of receiving the closure plate, and respective openings of the grooves face each other.

4. The intake air filter device according to claim 1, wherein the closure plate is mounted on the frame body through the closure plate engaging part.

5. The intake air filter device according to claim 1, wherein the frame body includes a tube sheet, and the filter member is supported on the tube sheet.

6. The intake air filter device according to claim 2, further comprising a fixture configured to detachably fix the closure plate to the frame body through the guide member.

7. The intake air filter device according to claim 1, further comprising a deck that is located on a lower side of the frame body and extends, in the direction in which the fluid is to flow through the intake air path, from the downstream side of the frame body.

8. The intake air filter device according to claim 1, further comprising a fence positioned in the intake air path on the downstream side of the frame body and at a distance from the filter member.

9. The intake air filter device according to claim 1, wherein:
   the filter member is one of a plurality of filter members, the plurality of filter members being positioned in series in the direction in which the fluid is to flow through the intake air path; and
   the closure plate is on the downstream side of the one of the plurality of filter members, the one of the plurality of filter members being located farthest downstream in the direction in which the fluid is to flow through the intake air path.

10. The intake air filter device according to claim 2, wherein the guide member is one of a plurality of guide members in an upper-lower direction, and a dimension of each of the plurality of guide members in the direction in which the fluid is to flow through the intake air path is different between adjacent guide members of the plurality of guide members.

11. A gas turbine comprising the intake air filter device according to claim 1.

12. A filter replacement method of an intake air filter device with a filter member in an intake air path of a gas turbine, the filter replacement method comprising:
   disposing a closure plate that covers a downstream-side surface of the filter member to be replaced which is disposed inside a frame body;
   dismounting the filter member to be replaced, on which the closure plate has been disposed, from the frame body toward an upstream side of the intake air path;
   mounting a replacement filter member on the frame body, from which the filter member to be replaced has been dismounted, from the upstream side of the intake air path; and
   removing the closure plate from the frame body on which the replacement filter member has been mounted.

13. The filter replacement method according to claim 12, wherein, in the disposing the closure plate that covers the downstream-side surface of the filter member to be replaced which is disposed inside the frame body, the closure plate is slid on a downstream side of the filter member to be replaced, in a direction intersecting a direction in which a fluid is to flow through the intake air path, so as to cover the downstream-side surface of the filter member to be replaced.

14. The filter replacement method according to claim 12, wherein:
   the filter member in the intake air path of the gas turbine is one of a plurality of filter members, the plurality of filter members being positioned in series in the direction in which the fluid is to flow through the intake air path; and
   in the disposing the closure plate that covers the downstream-side surface of the filter member to be replaced which is disposed inside the frame body, the closure plate is disposed on a downstream side of the one of the plurality of filter members, the one of the plurality of filter members being located farthest downstream in the direction in which the fluid is to flow through the intake air path.

15. The intake air filter device according to claim 5, wherein the tube sheet is a plate tube sheet.

16. The intake air filter device according to claim 8, wherein the fence is a mesh fence.

\* \* \* \* \*